April 19, 1960  E. F. KOELSCH  2,933,183
SUPPORT STRUCTURE FOR A MISSILE OR THE LIKE
Filed March 4, 1957  2 Sheets-Sheet 1
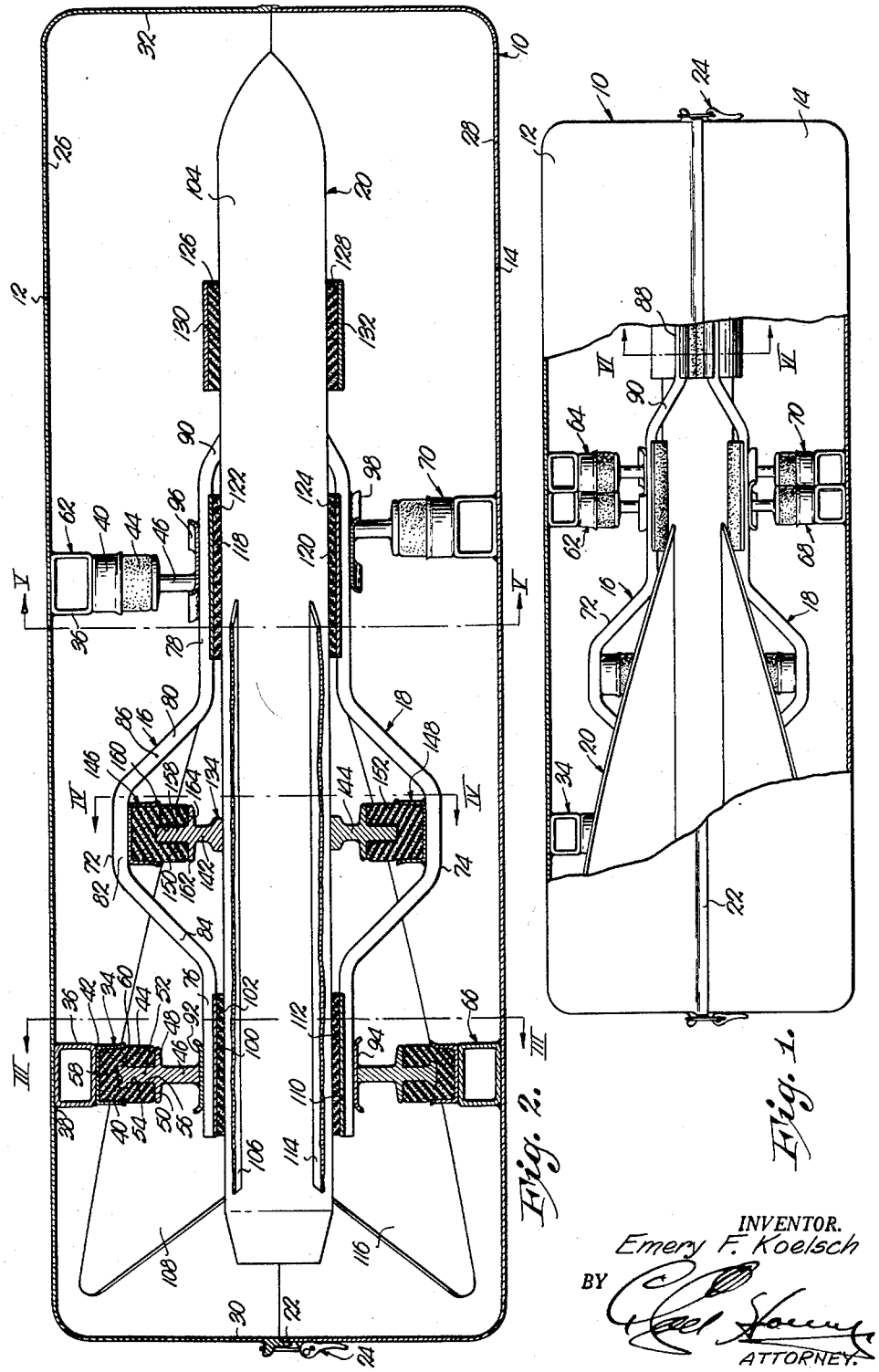
INVENTOR.
Emery F. Koelsch
BY
ATTORNEY.

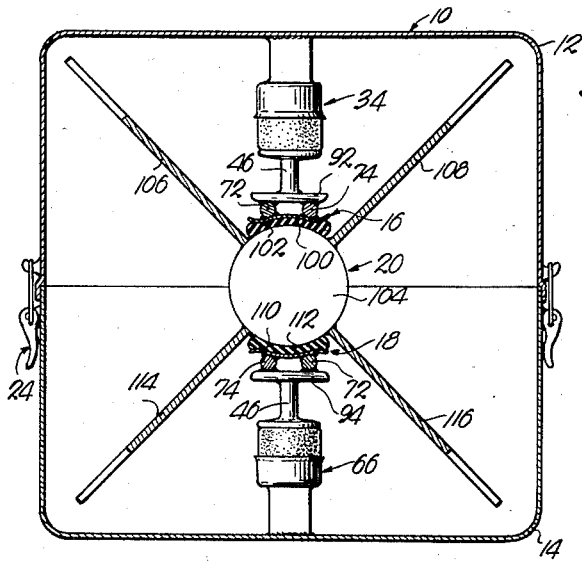
Fig. 3.
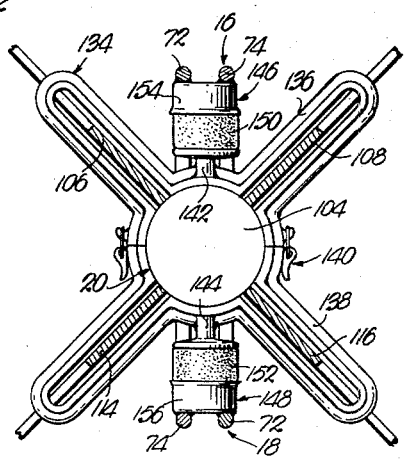
Fig. 4.
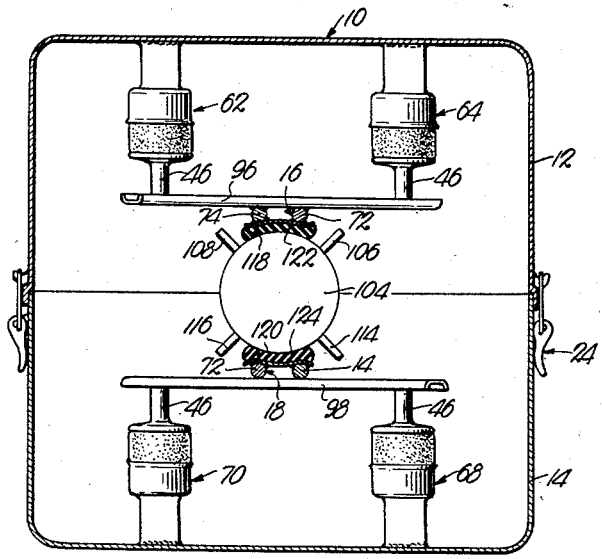
Fig. 5.
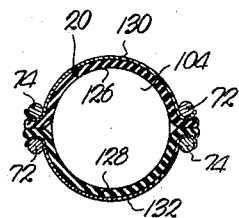
Fig. 6.
INVENTOR.
Emery F. Koelsch
BY
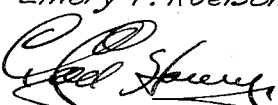
ATTORNEY.

United States Patent Office 2,933,183
Patented Apr. 19, 1960

2,933,183

SUPPORT STRUCTURE FOR A MISSILE OR THE LIKE

Emery F. Koelsch, Independence, Mo., assignor to The Vendo Company, Kansas City, Mo., a corporation of Missouri Application March 4, 1957, Serial No. 643,754

13 Claims. (Cl. 206—46)

This invention relates to the field of containers for objects of sensitive or delicate nature which must be protected from the effects of shock and vibration during shipment, storage and handling. This invention contemplates an improved type of object suspending apparatus for use with or as a part of the containers normally provided for such objects as missiles, scientific equipment and other forms of mechanism which must be protected from shock and vibration. Although the invention is not necessarily so limited, the embodiment of object chosen for illustrating the principles of the invention is elongated in nature and comprises a representative type of missile, which it will be understood includes sensitive and delicate components which might be damaged or rendered out of adjustment by excessive or sustained shock and vibration.

Heretofore, it has been the common practice to provide for the securement of such objects within an outer, protective casing or housing by means of suspension assemblies comprising opposed cushions interposed between the housing and normally in direct contact with the latter.

It is one of the important objects of this invention to provide an improved object suspending system for use within an outer protective housing which includes a pair of object supporting structures adapted to be disposed in opposed, object holding relationship, cushioning means on the structures in direct engagement with the object and between the structures and the object, and resilient cushioning means of nature particularly adapted for dampening and reducing shock and vibration interposed between the structures and the housing for mounting the former upon the latter.

It is another important object of the invention to provide resilient means for mounting the object holding structures upon the housing which are of nature offering resistance to and dampening of motion of an object held between the structures in any direction relative to the housing.

It is another important object of the invention to provide pluralities of such resilient, cushioning means mounting the structures on the housing, which are arranged in predetermined fashion and are of structural configuration offering resistance to alteration from their normal state either by way of compression, shear or tension.

It is another important object of the invention to provide, in addition to the cushioning means on the opposed structures which engage and support the object, auxiliary, shear resistant cushioning means coupled between the structures and the object by which reciprocatory and rotational movement of the object relative to the structures is resisted.

Another important object of the invention is to provide opposed supporting structures which are of frame-like nature and are specially configured to avoid resonance effects and any tendency for the structures themselves to vibrate sympathetically with shocks or vibrations which may be imparted to the outer housing.

It is another important object of the invention to provide an arrangement of the plurality of resilient, cushioning pod assemblies utilized to mount the structures on the housing by which, when certain pod assemblies are resisting a particular shock or force by their resilience in one of the compression, shear and tension modes of resistance, others of the pod assemblies are simultaneously caused to resist the same shock or motional tendency produced by such force by their resilience in different of such modes of resistance.

Still other important objects of the invention will be made clear or become apparent as the following description of a preferred embodiment of the invention progresses.

In the accompanying drawings:

Fig. 1 is a side elevational view of a container having a missile therein with the side of the outer housing broken away to indicate the relationship between the missile and certain parts of the object suspending system contemplated by the invention;

Fig. 2 is an enlarged cross sectional view of the container with the missile therein, taken along a substantially central longitudinal plane of the housing but with the missile illustrated in elevation with certain parts broken away to better show the relationship between the missile and the object suspending apparatus;

Fig. 3 is a cross sectional view taken on line III—III of Fig. 2;

Fig. 4 is a fragmentary, cross sectional view taken on line IV—IV of Fig. 2;

Fig. 5 is a cross sectional view taken on line V—V of Fig. 2; and

Fig. 6 is a fragmentary, cross sectional view taken on line VI—VI of Fig. 1 and showing only those details which illustrate the relationship between the missile and the supporting structures at that zone of the missile.

Referring now to the drawings, the container is seen to broadly include an outer housing or casing 10 having an upper section 12 and a lower section 14; and a pair of identical, opposed supporting structures broadly designated 16 and 18 for embracing and holding the missile or other object 20.

The form of housing 10 illustrated is a two-piece metal case in which the upper section 12 is provided with a lip 22 overlapping the lower section 14 along the zone of interengagement between the sections 12 and 14 presented when the housing 10 is in its closed condition. A number of conventional, releasable fastening devices broadly designated 24 and provided on the housing 10 and include parts on each of the sections 12 and 14 by which the sections may be rigidly locked together when the housing 10 is in the closed condition illustrated in the drawings. It will be understood that such fastening devices 24 may be of various, well known character having no direct bearing upon this invention. The sections 12 and 14 of housing 10 could conceivably be hinged in conventional fashion along one side of the housing 10 or fastening devices 24 may be provided around the entire periphery of the housing 10 for complete removal of the upper section 12 from the lower section 14 when the housing is to be opened for loading of the missile 20 therewithin or removal of missile 20 therefrom. Finally, in connection with the housing 10, it may be observed that, although the same could be merely frame-like in nature rather than closed, the preferred form of closed, metallic casing offers additional protection to the missile 20 from ingress of dirt and moisture and, by virtue of features forming no part of the instant invention utilized in manufacturing the sections 12 and 14 themselves, same are preferably rendered as rigid and resistant to shock and vibration as weight considerations will permit.

The upper section 12 and the lower section 14 respectively include a top wall 26 and a bottom wall 28 for the housing 10, which it will be understood are in direct opposition to one another when the housing 10 is in its illustrated, closed condition. For ease of discussion, one end wall of the elongated housing 10 is designated 30, which will be referred to as the rear of the housing 10, which the opposite end wall 32 will be considered and referred to as the forward end of the housing 10.

Since the object supporting structures 16 and 18 are substantially identical, except for their reversed and opposed disposition within the housing 10, a detailed description of one of same will suffice to disclose their construction. The structure 16 includes a single rear pod assembly generally designated 34 located centrally of the width of top wall 26 and rearwardly of the center of the housing 10. Pod assembly 34 includes a rigid mounting bracket 36 secured to the top wall 26 by welding or the like as at 38; an inverted, cup-like shell 40 secured to the bracket 36 as by welding at 42 with the open extremity of the cup 40 facing the opposed bottom wall 14 when the housing is in closed condition; a generally cylindrical, resilient pod element 44 of rubber, plastic, molded rubberized hair or the like having a portion adjacent one end thereof received and secured within the cup 40 by any suitable means, such as pinching of the cup 40 thereupon as illustrated, adhesive means (not specifically shown) or any other suitable fashion; and an elongated, rigid metallic member 46 having an outwardly extending flange 48 thereon normally in engagement with an end face 50 of the pod 44 remote from the cup 40, the member 46 further including a generally cylindrical portion 52 extending into and releasably but tightly received by a cylindrical stretch 54 of a concavity 56 provided in the pod 44 and extending from the face 50 of the latter to a zone of termination in a pocket 58 of enlarged diameter, which tightly receives an enlarged end portion 60 on the member 46. It will be seen that the pod 44 of the assembly 34 resists compression by the resistance of its resiliency to the engagement of flange 48 of member 46 with face 50 of pod 44, resists tension by the resistance of its resiliency to the engagement of the enlarged end portion 60 of member 46 with the internal walls of concavity 56 defining pocket 58 of the pod 44, and resists shear by the resistance of its resiliency to the engagement of the intermediate portion 52 of member 46 with the walls of concavity 56 defining stretch 54 thereof.

A pair of forward pod assemblies generally designated 62 and 64, which are identical in constructional detail to the pod assembly 34 just described, are provided forwardly of the center of the housing 10 and have their respective brackets 36 secured to the top wall 26 of section 12. Such pod assemblies 62 and 64 are offset from each other transversely of the top wall 26, and the pod assembly 62 is disposed slightly to the rear of the pod assembly 64, the pod assemblies 34, 62 and 64 thus being disposed upon the top wall 26 in an arrangement defining the vertices of an oblique triangle.

A lower, rear pod assembly 66 of construction such as described for the assembly 34 is disposed upon and secured to the bottom wall 28 of the lower section 14 in direct opposition to and alignment with the pod assembly 34 when the housing 10 is in a closed condition. A pair of lower, forward pod assemblies 68 and 70, which are also of the construction described for the pod assembly 34, are disposed upon and secured to the bottom wall 28 of the lower section 14 in generally opposed relationship to the upper, forward pod assemblies 62 and 64. The lower, forward pod assemblies 68 and 70 are spaced from each other laterally of the bottom wall 28 of the lower section 14 by substantially the same distances from each other and the medial plane of the housing 10 as the upper, forward pod assemblies 62 and 64; however, in the case of the lower, forward pod assemblies 68 and 70, assembly 68, which is generally opposite the upper, forward pod assembly 64, is the one that is spaced to the rear of its companion, lower, forward pod assembly 70. Thus, the lower pod assembly 68 is in general opposition to the upper pod assembly 64 but spaced to the rear thereof, while the lower pod assembly 70 is in general opposition to the upper pod assembly 62 but spaced forwardly thereof, the lower pod assemblies 66, 68 and 70 defining the vertices of an oblique triangle of reverse disposition but similar dimensions to that defined by the upper pod assembliess 34, 62 and 64. As will later become still more apparent, this particular disposition of the mentioned pod assemblies is significant by virtue of its effectiveness to damp or resist the development of direct harmonic vibrations in the structures 16 and 18, it being observed that the spacing between each of the upper pod assemblies 34, 62 and 64 and either of its companion pod assemblies is different, and the same is true for the lower pod assemblies 66, 68 and 70.

Each of the structures 16 and 18, apart from its associated pod assemblies above mentioned, is frame-like in nature and includes a pair of elongated, generally parallel, rigid rods 72 and 74 (see Fig. 3). The rods 72 and 74 each include rearmost straight stretches as at 76, intermediate straight stretches 78 aligned with and spaced forwardly of the stretches 76, generally C-shaped stretches 80 between and interconnecting the stretches 76 and 78 thereof (each of which C-shaped stretches includes a straight bight portion 82 parallel to but offset from the corresponding straight stretches 76 and 78, and a pair of straight leg portions 84 and 86 interconnecting the bight portions 82 with the corresponding straight stretches 76 and 78), forwardmost straight stretches 88, which are parallel to each other but more greatly spaced than the stretches 78 and offset from the latter in a direction oppositely to the offset of the bight portions 82 from the stretches 78, and straight, obliquely extending stretches 90 interconnecting the stretches 78 with the stretches 88 and diverging as the latter are approached. The elongated, rod-like members 72 and 74 forming the structure 18 are configured exactly as described for the structure 16 except that same are positionally reversed to place the structures 16 and 18 in opposed relationship, as will be clear in the drawings.

The rearmost, straight stretches 76 of rods 72 and 74 of structure 16 are rigidly interconnected by a cross piece 92 welded or otherwise secured thereto, such cross piece 92 being in turn welded or otherwise rigidly interconnected with the member 46 of the pod assembly 34. Similarly, a cross piece 94 interconnects the rods 72 and 74 of structure 18 and is rigidly interconnected with the missile member 46 of the lower rear pod assembly 66. An elongated cross piece 96 extending between and rigidly secured to the members 64 of upper pod assemblies 62 and 64 interconnects the intermediate straight stretches 78 of rods 72 and 74 of structure 16 and is rigidly secured thereto by welding or the like. A similar cross piece 98 interconnects the intermediate straight stretches 78 of the rods 72 and 74 of structure 18 and extends between and is secured to the members 64 of lower, forward pod assemblies 68 and 70.

A curved backing plate 100 is secured to the rearmost straight stretches 76 of rods 72 and 74 of structure 16 and carries thereon a resilient, upper, rear, cushion pad 102 (which may be secured to the plate 100 by adhesive or any other suitable means). The plate 100 and pad 102 are configured, as illustrated in Fig. 3, for relatively tight, partially embracing engagement with a rear portion of the generally cylindrical fuselage or main body 104 of the missile object 20, with the cushion pad 102 being disposed between a pair of fins 106 and 108 on the fuselage 104 of the missile 20. In similar fashion, a curved backing plate 110 mounted upon the straight rearmost stretches 76 of the rods 72 and 74 of the lower structure 18 carries a resilient cushion pad 112, which engages and partially embraces the fuselage 104 between the other fins 114 and 116 and in direct opposition to the engagement of the pad 102 with the fuselage 104 when the housing 10 is closed.

An upper, resilient cushion pad 118 and a lower resilient cushion pad 120 are respectively carried by the backing plates 122 and 124 in turn respectively secured to the intermediate straight stretches 78 of the rods 72 and 74 of the structures 16 and 18, as illustrated in Fig. 5, the pads 118 and 120 being in opposition to each other and receiving the fuselage 104 therebetween in partially embraced relationship when the housing 10 is closed.

Particularly where the missile or other object 20 is elongated and includes a greater portion of its length forwardly of its center of gravity, as is here assumed to be the case for illustrative purposes, additional stability of the object 20 between the structures 16 and 18 is achieved by the provision of the forwardmost stretches 90 and 88 of the rods 72 and 74 of the structures 16 and 18 and by the further provision of opposed, band-like, substantially semi-annular cushioning pads 126 and 128 oppositely embracing a forward portion of the fuselage 104 and respectively carried by band-like, substantially semi-annular, backing plates 130 and 132 in turn secured by welding or the like to the forwardmost stretches 88 of the rods 72 and 74 of the structures 16 and 18, as illustrated in Fig. 6.

It will be clear that the cushioning pads 102 and 112, 118 and 120 and, if provided, 126 and 128, will securely but resiliently hold the missile object 20 between the structures 16 and 18 when the housing is closed and are, in themselves, effective to prevent or damp any tendency of the object 20 to move in a manner displacing the location of its longitudinal axis. In order to further limit the object 20 against reciprocatory movement along or rotational movement about its longitudinal axis, however, it is desirable in the preferred form of the invention, to provide a clamp device generally designated 134 having a pair of separable parts 136 and 138 so configured as to tightly fit upon a portion of the object 20 adjacent the zone of its center of gravity and to be rigidly clamped thereon by means of releasable fasteners of any suitable type generally designated 140. As will be clear in Fig. 4, one form of device 134 may have its parts 136 and 138 so formed as to clear the portions of fins 106, 108, 114 and 116 which may extend along the fuselage 104 at the zone of the latter adjacent the center of gravity of the missile 20, although the precise form of the parts 136 and 138 is not deemed to be critical so long as they are adapted for being releasably and tightly clamped upon the missile 20 so as to become rigid thereto when installed thereon. Each of the parts 136 and 138 has rigidly mounted thereon the male member portion 142 and 144 respectively of auxiliary pod assemblies 146 and 148 respectively including resilient, female pod elements 150 and 152 in turn carried by cups 154 and 156. Cup 154 of pod assembly 146 is rigidly secured by welding to the bight portions 82 of rods 72 and 74 of the structure 16, while the cup 156 of pod assembly 148 is rigidly secured to the bight portions 82 of rods 72 and 74 of the structure 18. Each of the members 142 and 144 includes a cylindrical end portion 158 extending into and tightly received by a cylindrical concavity 160 in the corresponding element 150 or 152, and each of the members 142 and 144 is provided with an outturned flange 162 abutting the end face 164 of the corresponding element 150 and 152. It is noted, however, that the members 142 and 144 of the pod assemblies 146 and 148 do not include enlarged end portions, nor do the concavities 160 of the elements 150 and 152 include enlarged pockets at their inner termination, as described for the main pod assemblies 34, 62, 64, 66, 68 and 70. Although such structure could be provided, if desired, it is unnecessary since the pod assemblies 146 and 148 are utilized primarily only by employment of their resilient resistance to shear motion between the members 142 and 144 and the elements 150 and 152 thereof, such as would arise out of a shock or vibration tending to move the object 20 reciprocally along its longitudinal axis or rotationally relative to said axis. By eliminating the enlarged end portions from the members 142 and 144, the upper section 12 with the structure 16 carried thereby, may be more easily emplaced upon or removed from the missile 20, the lower section 14 and the structure 18 carried by the latter during loading and unloading operations.

It may be noted that the members 46 can be removed from the elements 44 of the main pod assemblies 34, 62, 64, 66, 68 and 70, when desired, which makes it possible for structures 16 and 18 of various configurations adapted to the supporting of particular, different objects 20, may be readily inserted for use in the same housing 10, provided merely that members 46 are similarly formed and arranged.

It is felt that the manner of loading and unloading a missile or other object 20 from the container contemplated by the invention will be obvious from the nature of the structure shown in the drawings and above described. It may be observed, however, that the device 134 is normally clamped upon the missile 20 prior to the loading thereof within the housing 10 and will be removed from the missile 20 upon unloading and before use of the latter.

The unique, three-point suspension of each of the structures 16 and 18 by the mentioned main pod assemblies associated therewith present paths for the transmission of shocks and vibrations imparted to the housing 10 which are ideally adapted to damp and diminish the impartation of same to the missile 20 suspended between the structures 16 and 18. It will be apparent that, any given shock or vibration which might otherwise tend to displace the missile 20 from its normal equilibrium position within the housing 10 will be resisted by all of the main pod assemblies 34, 62, 64, 66, 68 and 70 and that such resistance by the latter will be in differing relationships of compression, tension and shear between the members 46 and the elements 44 of the various main pod assemblies. This, together with the location of the main pod assemblies at the vertices of oblique triangles and the reversed disposition of such triangles as between the upper and lower sections 12 and 14, all cooperate to support the structures 16 and 18 in extremely stable condition, even though the housing 10 may be subjected to various shocks and vibrational influences. The further cushioned support of the missile 20 between the structures 16 and 18 by which it is held, together with the unique formation of the structures 16 and 18 by which direct and harmonic vibrations therein are essentially prevented, additionally increases the stability of the support for the missile 20. Finally, the auxiliary pod assemblies 146 and 148 preclude any possibility of shifting or vibration of the missile relative to the structures 16 and 18 in the only motional modes which are not otherwise restrained by the cushioned emplacement of the missile 20 by the fuselage engaging pads forming a part of the latter.

It will be appreciated by those skilled in the art that the embodiment shown in the drawings and above described in detail is intended as illustrative only and that a number of minor modifications or changes could be made from certain of the details of construction disclosed without departing from the true spirit and intention of the invention.

Accordingly, it is to be understood that the invention should be deemed limited only by the scope of the claims that follow.

Having thus described the invention what is claimed as new and desired to be secured by Letters Patent is:

1. A shock and vibration resistant container for an elongated object comprising an elongated, hollow, outer housing adapted to receive the object therewithin and having a pair of sections which are shiftable between relative dispositions respectively opening the housing for insertion and removal of the object and closing the housing for containment of the object, said sections being in opposed juxtaposition when in their housing-closing relationship; fastening means on the housing for releasably securing the sections in their housing-closing relationship; a pair of object-supporting structures within the housing when the sections are in their house-closing relationship; resilient, cushioning apparatus on each structure respectively adapted for engaging the object; and resilient, cushioning means for each structure respectively mounting each of the latter upon a corresponding section on the side of such section which faces the other section when the sections are in their housing-closing relationship, the structures being disposed relative to the sections for reception of the object between the structures and for opposite, partially embracing engagement of the cushioning apparatuses with the object when the sections are in their housing-closing relationship, said cushioning means for each structure comprising exactly three pod assemblies, each including a resilient, female element having a concavity therein and a male member extending into and received by the concavity, each of said elements having a face from which the concavity of the element extends inwardly and including a stretch extending inwardly from said face and an undercut pocket separated from said face by said stretch and of greater transverse cross-section than the latter, each of said members including an intermediate portion received by the corresponding stretch, there being an enlarged end portion at one extremity of said intermediate portion received by said pocket and a transversely extending portion engaging a major portion of said face, said three pod assemblies for each structure respectively mounting the latter on its corresponding section, a pair of said three assemblies for each structure being proximate one extremity of the structure and the third of such assemblies for each structure being proximate the opposite extremity of the structure.

2. A container as set forth in claim 1, wherein said third assemblies are proximate the same extremity of their respective structures.

3. A container as set forth in claim 1, wherein said assemblies for each structure are disposed at the vertices of a triangle.

4. A container as set forth in claim 1, wherein said assemblies for each structure are disposed at the vertices of an oblique-angled triangle.

5. A container as set forth in claim 4, wherein the third assemblies are in alignment, the pair of assemblies for one structure are disposed on a first line, and pair of assemblies for the other structure are on a second line whose projection upon the first line intersects the latter at an oblique angle.

6. A shock and vibration resistant container for an elongated object comprising an elongated, hollow, outer housing adapted to receive the object therewithin and having a pair of sections which are shiftable between relative dispositions respectively opening the housing for insertion and removal of the object and closing the housing for containment of the object, said sections being in opposed juxtaposition when in their housing-closing relationship; fastening means on the housing for releasably securing the sections in their housing-closing relationship; a pair of object-supporting structures within the housing when the sections are in their housing-closing relationship; resilient, cushioning apparatus on each structure respectively adapted for engaging the object, said apparatus on each structure including a resilient, rear pad having a concave, object-engaging surface, a resilient, forward pad having a concave object-engaging surface, and an auxiliary pod assembly, said rear pads being directly opposed to each other, said forward pads being directly opposed to each other and spaced from said rear pads, each of said auxiliary pod assemblies including a resilient, female element having a concavity therein, a male member extending into and received by the concavity, and means adapted for securing one of the elements and the member of each combination thereof to the object, the other of the element and the member of each combination thereof being carried by the corresponding structure; and resilient, cushioning means for each structure respectively mounting each of the latter upon a corresponding section on the side of such section which faces the other section when the sections are in their housing-closing relationship, the structures being disposed relative to the sections for reception of the object between the structures and for opposite, partially embracing engagement of the cushioning apparatuses with the object when the sections are in their housing-closing relationship.

7. A container as set forth in claim 6, wherein said auxiliary assemblies are disposed in direct opposition to each other and between the rear and front pads when the sections are in their housing-closing relationship.

8. A container as set forth in claim 6, wherein said last-mentioned means includes a device having a pair of relatively shiftable parts and releasable fastening means for securing the parts in a relationship adapting the device to be rigidly secured to the object, said one of the elements and the member of each combination thereof being mounted on the device.

9. A shock and vibration resistant container for an elongated object comprising an elongated, hollow, outer housing adapted to receive the object therewithin and having a pair of sections which are shiftable between relative dispositions respectively opening the housing for insertion and removal of the object and closing the housing for containment of the object, said sections being in opposed juxtaposition when in their housing-closing relationship; fastening means on the housing for releasably securing the sections in their housing-closing relationship; a pair of object-supporting structures within the housing when the sections are in their housing-closing relationship; resilient, cushioning apparatus on each structure respectively adapted for engaging the object; and resilient, cushioning means for each structure respectively mounting each of the latter upon a corresponding section on the side of such section which faces the other section when the sections are in their housing-closing relationship, the structures being disposed relative to the sections for reception of the object between the structures and for opposite, partially embracing engagement of the cushioning apparatuses with the object when the sections are in their housing-closing relationship, each of said structures comprising a pair of elongated, generally parallel, rigid rods, and a pair of cross-pieces rigidly interconnecting the rods adjacent their ends.

10. A container as set forth in claim 9, wherein the pair of rods of each structure have a pair of spaced, aligned, straight stretches and an intermediate, generally C-shaped stretch between said straight stretches.

11. A container as set forth in claim 10, wherein said intermediate stretch of the rods of each structure includes a straight bight portion and a pair of straight leg portions which diverge as the straight stretches are approached.

12. A container as set forth in claim 10, wherein the pair of rods of each structure terminate at one end thereof in a fork-like portion presented by each rod of the pair including a straight end stretch parallel to and spaced from the end stretch of the other rod a distance greater than the spacing between the remainder of the rods, and a connecting stretch interconnecting the end stretch with the adjacent straight stretch and diverging from the connecting stretch of the other rod as the end stretches are approached.

13. A container as set forth in claim 10, wherein said structures are disposed in direct opposition to each other with the bight portions of their intermediate stretches spaced apart a greater distance than their straight stretches when the sections are in their housing-closing relationship.

References Cited in the file of this patent

UNITED STATES PATENTS

| | | |
|---|---|---|
| 1,755,549 | Masury | Apr. 22, 1930 |
| 2,708,509 | Gould et al. | May 17, 1955 |